Figure 1:
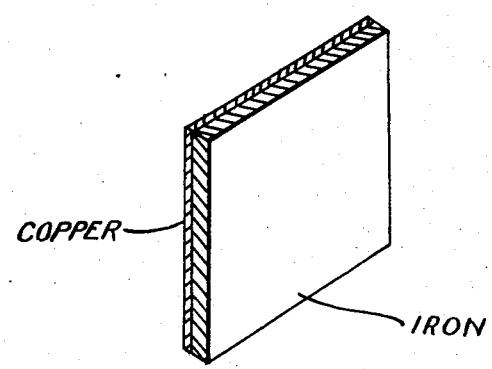

Oct. 11, 1949.   F. PRAKKE ET AL   2,484,311
DISCHARGE TUBE WITH PLATED ELECTRODE
Filed Aug. 8, 1946

INVENTORS
FRITS PRAKKE
WILLEM KEEMAN
KLAAS RODENHUIS
BY
ATTORNEY.

Patented Oct. 11, 1949

2,484,311

UNITED STATES PATENT OFFICE 2,484,311

DISCHARGE TUBE WITH PLATED ELECTRODE

Frits Prakke, Willem Keeman, and Klaas Rodenhuis, Eindhoven, Netherlands, assignors to Hartford National Bank and Trust Company, Hartford, Conn., as trustee Application August 8, 1946, Serial No. 689,118
In the Netherlands August 27, 1943

Section 1, Public Law 690, August 8, 1946
Patent expires August 27, 1963

2 Claims. (Cl. 250—27.5)

This invention relates to an electric discharge tube and more in particular to the constitution of the electrodes or other conductive members of such a tube, such as, for example, anodes, screens, or the like.

It is common practice to make such tube parts of nickel, iron, nickel-plated iron, aluminium-plated iron and similar materials. Now, if electrodes constructed in this manner are to be used in discharge tubes for short and very short waves, for example of less than 3 meters, difficulties occur due to the fact that the losses owing to the skin-effect become too high. The resistance due to this effect is, for example, represented by the formula $R = K\sqrt{s\mu f}$, in which $s$ is the specific resistance, $\mu$ the permeability, $f$ the frequency and $K$ a constant. The frequency being given it is necessary, in order to minimize the resistance losses, to choose material having a minimum permeability, that is to say non-magnetic material and consequently not nickel or iron, and to use material having a minimum specific resistance. In this respect metals like copper and silver are very favourable.

It is, however, impossible, at least in general, to make electrodes from copper or silver as these materials, particularly silver, are mechanically insufficiently resistant; in addition, they are very unfavourable in connection with high-frequency heating which is to be used for depriving the tube parts of gases, for the very reason that they have such a low specific resistance. Just in connection with this high-frequency heating metals like nickel and iron have a very favourable electric resistance and the magnetic losses of these metals are also high. Owing to these differently directed properties, metals like copper, silver and the like would have to be used in connection with one of the properties rather than nickel, iron or the like, but in connection with other properties it would be necessary to do the very reverse.

Now, these difficulties may be obviated by the use of an electric discharge tube according to the present invention containing one or more electrodes or other conductive parts built up from a base of nickel, iron, nickel-iron or similar materials which has applied to it a layer of copper, silver or other materials of similar conductivity whose thickness is from 15 to 30 microns.

In a discharge tube according to the invention the difference in depth of penetration of the electric current at larger and at smaller wavelengths is made available. This depth of penetration is, for instance for copper, at a wavelength of 3 meters about 6.5 microns; thus, if a layer of from 15 to 30 microns is used, electrodes of this kind have very good skin effect properties for use even on very short waves of decimeter and centimeter length, whilst at the same time they have highly satisfactory properties in connection with high-frequency deprival of gases, since at the wavelengths of from 50 to 1000 meters then used the depth of penetration is considerably greater, so that the electrodes are also deprived of gases in a highly satisfactory manner. Accordingly, a tube according to the invention is suitable above all tubes for use on short and very short waves.

It is, of course, essentially possible to use differing substances both for the core material and for the outer layer. A combination of a nickel core and a thin outer layer of copper, for example, has very favourable properties. It is, however, also possible to use other, well-known electrode materials, such as iron or the like, and to coat them with a film of copper or of other material whose conductivity is approximately of the same order of magnitude as that of copper.

Figure 2:
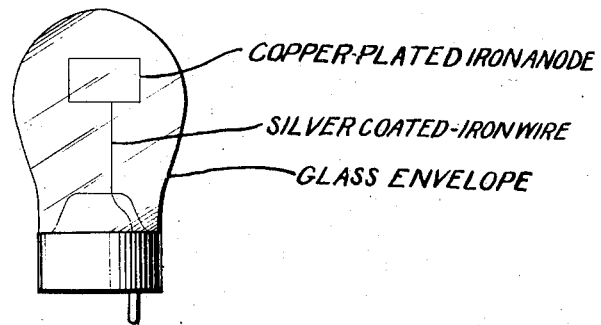

In order that the invention may be clearly understood and readily carried into effect, it will now be explained more fully with reference to the accompanying drawing in which Fig. 1 is a perspective view of an anode element in accordance with the invention and Fig. 2 is a schematic view of an electric discharge tube in which is used the anode of Fig. 1.

A plate-like element of iron which is to be used as the anode and whose thickness is 125 microns is coated with a copper layer from 10 to 15 microns thick before being housed in the tube. This coating may be effected in well-known manner, for example electrolytically or by cataphoretic agency. Next the electrode thus obtained is assembled with the other tube parts in the normal manner and the tube is then finished.

In a further form of construction an iron wire having a thickness of 250 microns and being suitable to act as a connecting element between an electrode and a current supply conductor is coated with a silver layer of from 10 to 15 microns. Such silver coating is preferably applied to those elements which are liable to oxydation, for example are arranged in the proximity of a seal, but which on the other hand are not overheated in the case of high-frequency heating or while the tube is in use.

What we claim is:

1. A high frequency electric discharge tube comprising an envelope and an electrode system within said envelope comprising a metallic body the major portion of which is selected from the group nickel, iron and cobalt, said body being plated to a thickness of from about 10 to about 30 microns with a metal of high electrical conductivity.

2. A high frequency electric discharge tube comprising an envelope, and an electrode system within said envelope comprising an electrode having a metallic body the major portion of which is selected from the group nickel, iron and cobalt, said body being plated to a thickness of from about 10 to about 15 microns with copper.

FRITS PRAKKE.
WILLEM KEEMAN.
KLAAS RODENHUIS.

REFERENCES CITED

The following references are of record in the file of this patent:

UNITED STATES PATENTS

| Number | Name | Date |
| --- | --- | --- |
| 1,543,033 | Snelling | June 23, 1925 |
| 1,872,359 | Sutherlin | Aug. 16, 1932 |
| 1,877,204 | Smalley | Sept. 13, 1932 |